ELECTRON PHOTOMICROGRAPH
5000 X

95 PARTS BY WEIGHT
As-Se 5 PARTS BY
WEIGHT CHLORINATED
RUBBER (BEFORE
ANNEALING)

ELECTRON PHOTOMICROGRAPH
5000 X

95 PARTS BY WEIGHT
As-Se 5 PARTS BY
WEIGHT CHLORINATED
RUBBER (ANNEALED AT
150°C FOR 1 HOUR)

United States Patent Office 3,697,265
Patented Oct. 10, 1972

3,697,265
VITREOUS SELENIUM ALLOY MATRIX CONTAINING ISOLATED PARTICLES AND PARTICLE NETWORKS OF RESIN
Leon A. Teuscher, Webster, Michael P. Trubisky, Fairport, Frank M. Palermiti, Pittsford, and Charles J. Levine, Rochester, N.Y., assignors to Xerox Corporation, Rochester, N.Y.
Filed June 25, 1969, Ser. No. 836,560
Int. Cl. G03g 5/04, 5/08
U.S. Cl. 96—1.5
20 Claims

ABSTRACT OF THE DISCLOSURE

A xerographic plate having a novel photoconductive layer comprising a major portion of a vitreous selenium alloy blended with a minor portion of an insulating resin in the form of isolated particles and/or a partial resin network surrounded by a vitreous selenium alloy matrix.

BACKGROUND OF THE INVENTION

This invention relates to xerography and more specifically to a novel photoconductive composition and method of use.

The concept of xerography was originally described by Carlson in U.S. Pat. 2,297,691 and is further amplified and described by many related patents in the field. The discovery of the photoconductive insulating properties of highly purified vitreous selenium has resulted in this material becoming a standard in reuseable commercial xerography. The outstanding advantages of vitreous selenium is its capability of holding and retaining an electrostatic charge for long periods of time when not exposed to light, and its relative sensitivity to light as compared to many other photoconductive materials. In addition, vitreous selenium exhibits excellent physical strength and stability to be reused or cycled thousands of times.

Vitreous selenium, however, does suffer from one serious disadvantage in that it becomes unstable at temperatures slightly above about 100° F., and begins to crystallize and become conductive in the dark rendering it unsuitable for use in xerography. U.S. Pats. 2,803,542 and 2,822,300 to Ullrich and Mayer et al., respectively, teach that the incorporation of elemental arsenic with selenium not only increases the spectral response of the selenium but in addition greatly increases the resistance of selenium to crystallization at elevated temperatures. In addition to alloying with arsenic, the addition of a halogen such as iodine or chlorine when added to arsenic-selenium alloys has been found to improve electrical characteristcs such as sensitivity and spectral response. This contribution to the art is set forth in U.S. Pat. 3,312,548 to Straughan.

The arsenic-selenium alloys described in the above patents, are normally prepared by mixing a master alloy having the appropriate proportion of arsenic and selenium and placing the material in a closed container capable of being evacuated. The evaporation is carried out under vacuum conditions by heating a crucible containing the alloy mixture and allowing vapors of the arsenic-selenium alloy to condense and form a vitreous layer on a substrate normally supported above a crucible containing the alloy.

Arsenic-selenium alloys used in commercial xerographic machines are generally in the form of a glassy or vitreous material layer contained on a rigid substrate either in the form of a metal flat plate or a cylindrical drum. When arsenic-selenium alloys of the above type are vacuum evaporated or coated onto a flexible substrate such as a belt or sleeve, a problem of cracking or flaking off of the amorphous alloy layer occurs during repetitive cycling due to the brittleness or low flexibility of the amorphous arsenic-selenium alloy. For this reason, the arsenic-selenium alloys in the vitreous form, such as those mentioned above, have been limited in use to rigid supporting substrates such as the flat plates and drums mentioned above in which the flexing of the photoconductive alloy is not a factor. However, in the use of high speed machines, the use of a flexible belt or sleeve is highly desirable because of the advantages of full frame exposure. In addition, flexible photoconductive belts offer machine design advantages such as a larger development zone.

In addition to arsenic, selenium may be alloyed with other elements such as sulfur, bismuth, antimony, tellurium, thallium, and mixtures thereof in order to enhance both the electrical characteristics and/or physical properties of the photoconductive composition. These alloys, however, also generally suffer from the same lack of flexibility exhibited by arsenic-selenium alloys.

It can be seen from the above discussion that the use of vitreous selenium alloys on a flexible or movable substrate would be highly desirable, but serious problems with regard to limitations in physical properties must first be overcome.

OBJECTS OF THE INVENTION

It is, therefore, an object of this invention to provide a xerographic plate employing a vitreous selenium alloy photoconductor especially adapted for flexible belts and sleeves.

It is a further object of this invention to provide a novel photoconductive alloy layer containing a minor portion of a resin binder material.

It is yet another object of this invention to provide an improved xerographic plate employing a novel photoconductive layer.

It is a further object of this invention to provide a method of imaging a novel photoconductive layer.

SUMMARY OF THE INVENTION

The foregoing objects and others are accomplished in accordance with this invention by providing a xerographic member in which the photoconductive layer comprises a blend of a major portion of a vitreous photoconductive selenium alloy composition and a minor portion of an insulating organic resin binder material. This photoconductive composition exhibits outstanding physical flexibility as compared to conventional vitreous selenium alloys. A preferred composition comprises vitreous arsenic-selenium which exhibits the thermal stability and photosensitive advantages of binderless vitreous arsenic-selenium layers with the additional advantage of exhibiting great flexibility due to a small but a critical amount of binder used in conjunction with the vitreous arsenic-selenium material. The advantages of the improved photoconductor and method of the instant invention will become apparent upon consideration of the folowing disclosure of the invention; especially when taken in conjunction with the accompanying drawings wherein:

Figure 1:
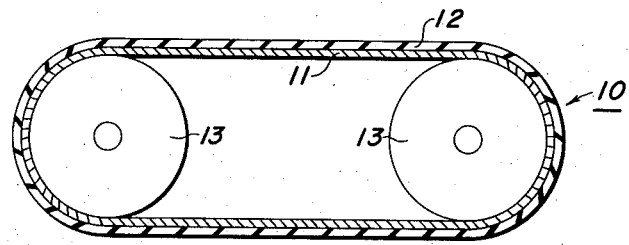
FIG. 1 is a schematic illustration of a flexible belt suitable for xerographic utility.

Referring to the drawings, reference character 10 designates a xerographic member in the form of a flexible belt having a supporting substrate 11 made up of a conductive material such as brass, aluminum, steel or the like. Although shown as flexible belt or sleeve the supporting substrate may be of any convenient thickness, rigid or flexible, and may be in any desired form such as a sheet, web, plate, cylinder, drum or the like. It may also comprise other materials such as metallized paper, plastic sheets coated with a thin layer of metal such as aluminum, copper iodide, or glass coated with a thin conductive coating of chromium or tin oxide.

Layer 12 overlays substrate 11 and comprises a photoconductive vitreous selenium alloy blended with a relatively small amount of an electrically insulating organic resin binder. The thickness of the photoconductor layer is not critical. Thicknesses of about 10 to 300 microns are suitable for xerographic utility, but thickness falling outside this range could also be used. For most xerographic applications, however, thicknesses in the range of about 20 to 100 microns have been found satisfactory. Belt 10 is mounted over rollers 13 which are adapted to move the surface of the belt through a conventional xerographic cycle which usually includes charging, exposing and developing.

The photoconductor is first blended with a minor portion of an insulating resin binder. It should be understood that any suitable selenium containing photoconductive glass is included within the scope of this invention. Typical selenium glasses comprise arsenic-selenium, arsenic-sulfur-selenium, bismuth-selenium, antimony-selenium, arsenic-antimony-selenium, selenium-tellurium, and mixtures thereof. A particularly preferred photoconductor comprises an arsenic-seleinum alloy containing aresenic in the range of about 0.5 to 50 weight percent with the balance substantially selenium. In view of the thickness range generally used for xerographaic purposes, it is essential that the particle size of the photoconductive alloy prior to forming the photoconductive layer be carefully controlled within a critical size range. Although particle sizes up to 50 microns may be tolerated in some instances, it is preferred that photoconductive alloy particles be maintained in a range of about 1 to 10 microns in order that good dispersion be maintained in the alloy-binder layer and optimum photoconductive properties result. A typical size distribution for alloys of this invention is shown in the table below.

TABLE

Photoconductor particle size distribution

| Percent: | $\mu$ |
|---|---|
| 88.3 | <10 |
| 8.5 | 10–20 |
| 2.9 | 20–30 |
| 0.3 | 40–50 |

The binder material which is blended with the vitreous alloy may comprise any suitable electrically insulating resin. The binder material is an insulator to the extent that an electrostatic charge on the surface of the photoconductive layer is not conducted by the binder at a rate to prevent the formation and retention of a latent electrostatic image. Typical materials include polystyrene, polyesters, phenoxies, silicone resins, acrylic and methacrylic ester polymers, ethyl cellulose, cellulosic resins such as nitrocellulose, vinyl polymers, expoxies and mixtures thereof. One particularly satisfactory binder includes chlorinated rubbers (chlorinated polyolefins) which may be defined as natural rubbers, or more often, polyolefins, to which fairly large amounts of chlorine are added (up to 65 percent or more) in order to modify the properties of the elastomer. Typical examples are "Parlon" a chlorinated natural rubber, and "Parlon P," an isotactic polypropylene available from the Hercules Powder Co., Inc.; "Hypalon" a polyethylene available from E. I. du Pont de Nemours and Company.

In general, the photoconductor is present in an amount of from about 60 to 97 percent by weight with the binder comprising about 3 to 40 percent by weight. A preferred range of photoconductor in an amount of from about 90 to 95 percent by weight, with the binder in an amount of about 5 to 10 percent by weight has been found to exhibit preferred electrical characteristics.

These binder materials may be simply blended with the arsenic-selenium photoconductor by mixing the desired portion of photoconductive material in particulate form with the appropriate resin, usually diluted in a solvent, and flowing or spraying the dispersion in desired thickness onto a supporting substrate. The solvent is evaporated by allow-supporting substrate. The solvent is evaporated by allowing the coating to dry, or may be accelerated by heating the layer slightly in a hot air oven or other appropriate laboratory apparatus. At this point the photoconductive-resin layer consists of a major portion of discrete vitreous photoconductive particles mixed with a minor portion of an insulating resin surrounding or partially surrounding the individual photoconductive particles. The layer is then annealed by heating to a temperature in the range of or above the glass transition temperature of the particular photoconductive alloy to allow the alloy to flow and coalesce to form a somewhat continuous vitreous selenium alloy matrix containing discrete particles or areas of resin dispersed randomly throughout the photoconductive matrix. Usually the annealing is carried out at a temperature above the glass transition temperature for about 30 minutes to several hours. Neither the exact temperature or time is critical as long as the conditions are sufficient to cause the photoconductive glass particles to flow or coalesce together to form a vitreous photoconductive matrix.

Figure 2:
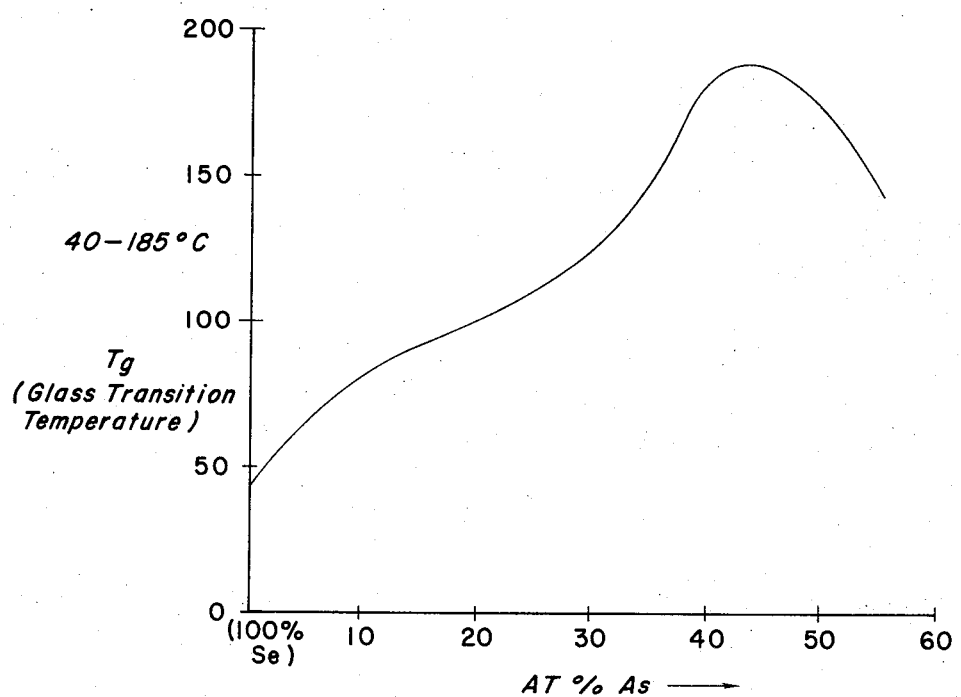
FIG. 2 illustrates a plot of the glass transition temperature for vitreous arsenic-selenium alloys of the instant invention.

FIG. 2 illustrate the glass transition temperature range for vitreous selenium-arsenic alloys. It can be seen that the glass transition temperature varies from about 40 to 185° C. for arsenic concentrations varying from about zero to slightly over 40 atomic percent arsenic. This glass transition temperature range for arsenic-selenium broadly includes the glass transition temperature for other selenium alloys falling within the scope of this invention.

Other suitable selenium-antimony photoconductors are disclosed in U.S. Pat. 3,490,903, which include antimony in a range of about 5 to 21 percent by weight with the balance selenium. Suitable arsenic-selenium-antimony photoconductors are disclosed in U.S. Pat. 3,534,745, which include arsenic in a range of up to about 49 percent by weight, selenium in an amount of not less than about 40 percent, and antimony in an amount of about 0.15 to 31.0 percent. Suitable arsenic-sulfur-selenium photoconductors are disclosed in application Ser. No. 609,221, filed Jan. 13, 1967, now abandoned, which includes arsenic in an amount up to about 18 weight percent, sulfur in an amount of about 10 to 90 percent, and selenium from about 10 to 90 percent. Suitable selenium-bismuth photoconductors are disclosed in co-pending application Ser. No. 798,750, filed Feb. 12, 1969 which includes bismuth in a preferred range of about 1 to 10 weight percent with the balance being substantially selenium.

DESCRIPTION OF THE PREFERRED EMBODIMENTS

A particularly preferred technique employing a photoconductor having a suitable glass transition temperature and an insulating binder results in a xerographic plate exhibiting outstanding electrical characteristics and physical properties. This plate and method of preparation involves matching the glass transition temperature of the appropriate selenium alloy with a suitable insulating resin binder which is compatible with the annealing treatment following the formation of the photoconductor-resin layer. That is, the annealing treatment following the formation of the photoconductive layer must not adversely affect the resin binder. This process results in a dramatic change in the viscosity of the selenium alloy particles during the annealing step following the initial coating of the substrate and is characterized by the flowing and coalescing together of the photoconductive particles to form a vitreous photoconductive matrix of a selenium alloy blended with isolated and/or separate particles or areas of resin binder. This particular technique and structure exhibit outstanding physical flexibility with regard to flexible belt applications and are characterized by the outstanding electrical characteristics associated with binderless selenium alloy photoreceptor layers.

Figure 3A:
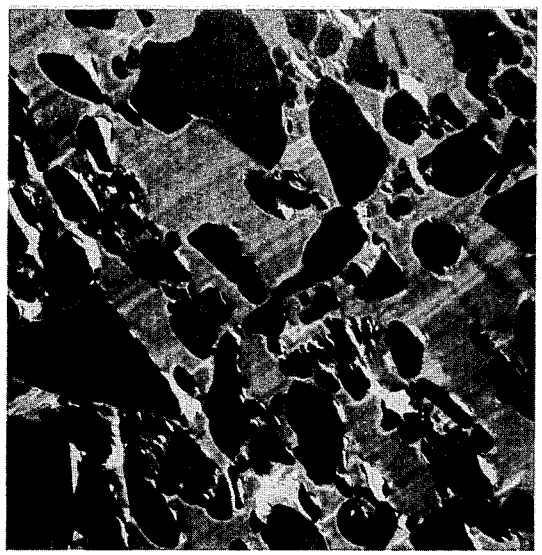
FIGS. 3a and 3b illustrate a typical photoconductive-binder structure of the instant invention as observed under an electron microscope.
Figure 3B:
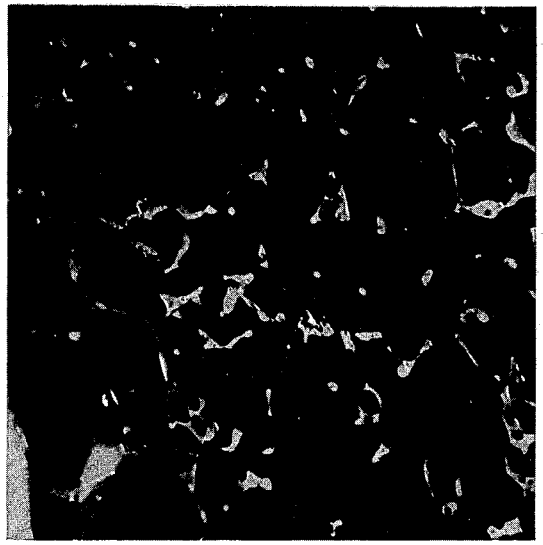

FIG. 3a illustrates the microstructure of a plate cross-section of the present invention at a magnification of 5000× as observed with an electron microscope. The structure comprises 95 parts by weight of vitreous arsenic-selenium particles (27 wt. percent As-73 wt. percent Se) mixed with 5 parts by weight of a chlorinated rubber available from Hercules Powder Company under the tradename "Parlon." The photoconductor particles are illustrated by the dark particulate structure while the lighter or gray portions illustrate the rubber binder. The structue shown in FIG. 3a is observed prior to annealing and is representative of coatings of the instant invention which are formed after evaporation of the resin solvent. FIG. 3b illustrates the structure of 3a after annealing at 150° C. for one hour resulting in the fusing or coalescence of the photoconductive particles into a photoconductive matrix (dark areas) which surround the lighter or gray resin areas or particles. It is also believed that the resin may be present in the form of partial networks in addition to discrete particles or areas. The photoconductive layer illustrated in FIGS. 3a and 3b was prepared by the method used in Example I below.

The following examples further specifically define the present invention with respect to the method of making a selenium alloy photoconductive layer containing a minor portion of a resin binder. The percentages are by weight unless otherwise indicated. The examples below are intended to illustrate various preferred embodiments of making a selenium alloy resin-containing photoconductive layer.

Example I

A xerographic plate is made by the following technique:

A vitreous alloy made of 17 percent arsenic, 82.9 percent selenium and 0.1 percent iodine is pulverized in a micro mill for 15 minutes. The crushed material was then sieved thru a 325 mesh screen. The power was analyzed by microscopy and 89 percent of the particles were estimated to be smaller than about 10μ. Ninety-five grams of the sieved powder was then hand mixed with 50 grams of a 10 percent chlorinated rubber solution in toluene (sold by the Borden Chemical Company as chlorinated rubber). This mixture was coated with a Byrd coater upon a 4 mil thick brass foil to allow for a final dry coating thickness of about 20 microns. The coated plate was then dried for 30 minutes at 50° C. and then annealed at 165° C. for 1 hour. The coated brass plate is fitted over an aluminum drum blank of a Xerox 813 office copier and imaged in the conventional xerographic mode. This plate printed well in the modified 813 machine. Electrical data from a xerographic scanner showed that the plate speed was 2.5 times that of vitreous selenium under the same conditions of testing, and exhibited a cycled residual potential of zero volts. In adidtion, the plate exhibited excellent physical flexibility.

Example II

A second plate is made by providing an alloy of 28 percent arsenic, 71.9 percent selenium and 0.1 percent iodine and then crushing the alloy in a planetary mill for 30 minutes. The crushed material is then sieved thru a 325 mesh screen. Forty-eight grams of sieved powder is mixed for 1 hour in the planetary mill with 2.5 grams of chlorinated rubber (Borden Chemical Company). To this dry mixture 25 grams of toluene is added and the materials mixed for 1 hour in the planetary mill. The resulting mixture is coated on a 4 mil thick brass foil with a Byrd coater to allow for a 48 micron thick dry coating. The coated plate is dried at 50° C. for 15 minutes and then annealed at 175° C. for 1 hour. The coated brass plate is then fitted over an aluminum drum blank for a Xerox 2400 office copier and cycled to study its electrical characteristics. During cycling the plate speed was 4 to 5 times that of vitreous selenium, and the cycled residual potential was zero volts.

Example III

A third plate is prepared using the method of Example II, to obtain a dry coating thickness of about 90 microns. The electrical characteristics of the plate were comparable to the plate of Example II. In adidtion, the plate was used to reproduce original copies and produced good quality prints with low background. The plate also exhibited excellent physical flexibility.

Example IV

A fourth plate is prepared using the method of Example II. In this method the plate is annealed for 1 hour at 150° C. instead of 1 hour at 175° C. This plate exhibits a higher residual potential than the plate of Example II, but shows excellent flexibility.

Example V

A fifth plate is prepared using the method of Example II. In this example the chlorinated rubber is replaced with a phenoxy resin available under the trade name PKHH from Union Carbide. The electrical and physical properties of this plate are similar to the plate of Example II.

EXAMPLE VI

A sixth plate is prepared using the method of Example II. The photoconductor comprises 28 percent arsenic and 72 percent selenium in a layer about 60 microns thick. The plate exhibits excellent electrical and physical properties.

In forming photoconductive layers by the annealing technique exhibited in the above examples, electron photomicrographs and other data indicate that the photoconductor, prior to annealing, is generally uniformly dispersed in the resin, with each photoconductive particle being coated with a layer of resin, as shown in FIG. 3a. It has also been observed that the film prior to annealing contains approximately 40 percent void space. During the annealing step, which is at about or above the glass transition temperature for the particular photoconductive selenium alloy, the alloy particles flow and coalesce with each other to form a vitreous alloy matrix containing resin particles dispersed throughout the alloy matrix. Stated another way, the photoconductive particles flow and fuse together sealing up most of the prior void space. The resin accumulates in areas up to about 5 microns in size or diameter surrounded by a somewhat continuous vitreous selenium alloy matrix as shown in FIG. 3b. The resin is osberved as both discrete islands or isolated particles and may also occur as resin networks partially or completely surrounding portions of the photoconductive matrix.

The following example illustrates the advantages of the instant invention with respect to flexible belt applications.

Example VII

A binderless vitreous arsenic-selenium photoconductive layer is formed by vacuum evaporation on a 4 mil thick brass foil by the method set forth in U.S. Pat. 2,822,300 to Mayer. The photoconductive layer is 20 microns thick and comprises 40 percent arsenic and 60 percent selenium. This plate is tested for mechanical flexibility by flexing a number of times over a two inch diameter steel roller. After several flexings the arsenic-selenium layer cracked severely indicating relatively poor adhesion and strength when used under flexible conditions. Three plates comprising 20, 44, and 57 micron thick binder layers, respectively, and each containing 5 parts chlorinated rubber binder (Borden Chemical Company) and 95 parts of a 28 percent arsenic-72 percent selenium alloy were prepared by the method of Example II. These plates are each flexed 500,000 times over the same two inch diameter roller and exhibits no cracking.

The test carried out in Example VII above clearly indicates that plates containing a small but critical amount of resin in conjunction with a vitreous selenium alloy exhibit outstanding flexibility with no deterioration or degradation in electrical characteristics.

It should be understood that dopants and other additives may be added to the vitreous selenium alloys of the instant invention in order to synergize or otherwise enhance the properties of these materials. For example, minor additions of impurities may be used to enhance the electrical characteristics of the photoconductor. It has been found that very small amounts of halogens such as iodine, chlorine, bromine and fluorine may be added to the photoconductor in order to increase the spectral sensitivity and other electrical properties. Halogen additions have been found particularly advantageous when used with arsenic-selenium alloys in amounts ranging from about 10 to 10,000 parts per million. When using additives or dopants, such materials may be added to the photoconductor directly, or may be added to the photoconductor-resin mix, and if desired, may be incorporated as part of the binder material.

Although specific components and proportions have been stated in the above description of the preferred embodiment of this invention, other suitable materials and procedures such as those listed above may be used with similar results. In addition, other materials and modifications may be utilized which synergize, enhance, or otherwise modify the photoreceptor layer.

Other modifications and ramifications of the present invention would appear to those skilled in the art upon reading the disclosure. These are intended to be within the scope of this invention.

What is claimed is:

1. A photosensitive element comprising a conductive support having thereon a photosensitive layer, said photosensitive layer comprising a major portion of a vitreous selenium alloy blended with a minor portion of an insulating resin, said structure being characterized by isolated resin particles and areas dispersed randomly within a continuous vitreous selenium alloy matrix.

2. The layer of claim 1 in which the resin is also present in the form of partial networks.

3. The layer of claim 1 in which the selenium is alloyed with a material selected from the group comprising arsenic, sulfur, bismuth, antimony, tellurium, and mixtures thereof.

4. The layer of claim 1 in which the selenium alloy comprises arsenic-selenium.

5. The layer of claim 4 in which the arsenic is present in an amount from about 0.5 to 50 percent by weight.

6. The layer of claim 5 in which the arsenic-selenium is doped with a halogen.

7. The layer of claim 1 in which the layer thickness is from about 10 to 300 microns.

8. The layer of claim 1 in which the selenium alloy comprises 90 to 95 percent by weight and the resin 5 to 10 percent by weight of said layer.

9. A xerographic plate having an electrically conductive support member having a photoconductive insulating layer thereon, said photoconductive layer comprising about 90 to 95 percent by weight of a continuous vitreous arsenic-selenium alloy having dispersed randomly therein about 5 to 10 percent by weight of an insulating resin.

10. The plate of claim 9 in which the arsenic is present in an amount from about 0.5 to 50 weight percent.

11. A photosensitive element having a photoconductive insulating layer, said layer comprising a major portion of a vitreous photoconductive selenium alloy in a concentration of about 60 to 97 percent by weight, with a minor portion of an insulating resin in a concentration of about 3 to 40 percent by weight, said photoconductive insulating layer being characterized by a continuous vitreous selenium alloy matrix having dispersed randomly therein a minor portion of an insulating resin in the form of insulated resin particles and areas.

12. The element of claim 11 in which the resin is also present in the form of partial networks.

13. The element of claim 11 in which the resin comprises a chlorinated rubber.

14. The element of claim 11 in which the photoconductor comprises an arsenic-selenium alloy.

15. The element of claim 11 in which the photoconductor comprises an arsenic-selenium alloy in an amount from about 90 to 95 percent by weight, with the resin being present with an amount from about 5 to 10 percent by weight.

16. A method of imaging comprising:
   (a) providing a xerographic plate having a supporting substrate containing a photoconductive layer thereon, said layer comprising a major portion of a vitreous selenium alloy and a minor portion of an insulating resin dispersed randomly therein in the form of isolated particles and partial resin networks contained within a vitreous selenium alloy matrix,
   (b) forming an electrostatic image on the surface of said plate, and
   (c) developing said image to make it visible.

17. The method of claim 16 in which the latent electrostatic image is formed by first uniformly charging the surface of the photoconductive layer followed by selectively exposing said charged surface to a pattern of activating radiation.

18. The method of claim 16 in which the selenium is alloyed with a material selected from the group comprising arsenic, sulfur, bismuth, antimony, tellurium, and mixtures thereof.

19. The method of claim 16 in which the alloy comprises vitreous arsenic-selenium.

20. The method of claim 16 in which the arsenic is present in an amount from about 0.5 to 50 weight percent.

References Cited

UNITED STATES PATENTS

| | | | |
|---|---|---|---|
| 2,663,636 | 12/1953 | Middleton | 96—1.5 |
| 3,121,006 | 2/1964 | Middleton et al. | 96—1.5 |
| 2,803,542 | 1/1958 | Ullrich | 96—1.5 |
| 2,822,300 | 3/1958 | Mayer et al. | 96—1.5 |
| 3,312,548 | 4/1967 | Stranghan | 252—501 X |

FOREIGN PATENTS

| | | | |
|---|---|---|---|
| 385,449 | 9/1963 | Japan | 96—1.5 |

GEORGE F. LESMES, Primary Examiner

R. E. MARTIN, Assistant Examiner

U.S. Cl. X.R.

252—501

UNITED STATES PATENT OFFICE
CERTIFICATE OF CORRECTION

Patent No. 3,697,265　　　　　　　　　Dated October 10, 1972

Inventor(s) Leon A. Teuscher et al

It is certified that error appears in the above-identified patent and that said Letters Patent are hereby corrected as shown below:

Claim 16, column 8, line 34, before the word "vitreous" insert --continuous--.

Claim 18, column 8, line 46, delete "theretof" and insert --thereof--.

Signed and sealed this 8th day of May 1973.

(SEAL)
Attest:

EDWARD M. FLETCHER, JR.　　　　　　ROBERT GOTTSCHALK
Attesting Officer　　　　　　　　　　Commissioner of Patents